June 27, 1933.    F. E. TERMAN    1,915,558
MODULATION METER
Filed June 22, 1931

INVENTOR,
FREDERICK E. TERMAN.
BY Donald K. Lippincott
ATTORNEY.

Patented June 27, 1933

1,915,558

UNITED STATES PATENT OFFICE

FREDERICK E. TERMAN, OF STANFORD UNIVERSITY, CALIFORNIA

MODULATION METER

Application filed June 22, 1931. Serial No. 546,023.

My invention relates to metering circuits for measuring the degree or percentage of modulation of high frequency electric currents.

Among the objects of my invention are: To provide a metering system which is independent of the amplitude of the electric wave to be metered; to provide a system whose indications may be read directly without computation; to provide a metering system which may be adapted to give its most accurate results for either high percentages or low percentages of modulation, as may be desired; and to provide a metering system which may be adapted either for heavy duty service, or to give accurate indications where very small amounts of high frequency power are available for operating the system.

Other objects of my invention will be apparent or will be specifically pointed out in the description forming a part of this specification, but I do not limit myself to the embodiment of my invention herein described, as various forms may be adopted within the scope of the claims.

Referring to the drawing:

Figures 1, 3, and 4 are circuit diagrams showing various modifications of the system of my invention which are applicable where there is sufficient power in the modulated current circuit to actuate the meter directly without too great a drain on the system.

Figure 1:
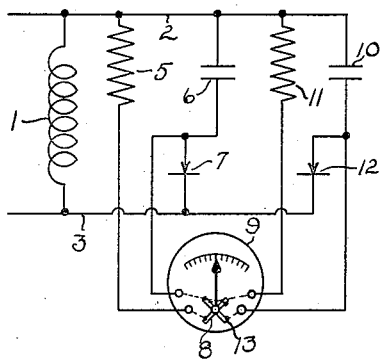

Broadly considered, my invention comprises a pair of detector circuits, which are associated with the circuit carrying the modulated high frequency current whose degree of modulation is to be measured. In general, detector circuits have no upper frequency limit to the modulation frequency which they will detect, this frequency limit being dependent upon the time constant of the circuit as determined by the resistance and capacitance therein. One of the two detector circuits is designed with a time constant which is large as compared with the lowest modulating frequency to be used, where as the other detector circuit has a time constant which is small as compared with the period of the highest modulating frequency. In other words, the first circuit has an upper frequency limit which is so low that it will not detect the lowest modulation frequency, whereas the second circuit has a high frequency cut-off above the highest modulating frequency. As a result of this arrangement, the detected output of the first circuit will be proportional to the crest value of current or voltage in the modulated current circuit, whereas the output of the second detector circuit will follow the envelop of the modulated wave. Means are provided for integrating the output of the second circuit to give the mean value of the modulated wave, and for comparing directly the output of the two detector circuits, thereby giving directly the degree of modulation.

In modern practice, two types of detectors are in general use, the first being the vacuum tube in its various forms, and the second being the "contact type rectifier" such as the crystal detector and the copper oxide rectifier.

Both of these general classes of detectors involve a process of rectification or its equivalent, and the upper limit of the modulating frequencies which they will detect is dependent upon the time constant of the circuit into which the rectified current is fed, this time constant being equal to the product of the capacitance in the circuit and its resistance. The successive rectified impulses serve to charge the capacitance in the circuit, which discharges through the resistance. If the capacitance is large or the resistance large, or both, the condenser will not charge to the peak value of any single impulse or small group of impulses, nor will it discharge between groups, but it will gradually assume a charge which is dependent upon the crest value of the charging voltage. If capacitance and resistance are both small, a single impulse or a very small group thereof will charge it fully, and the charge will leak off through the resistance rapidly enough so that the magnitude of the charge will follow the envelop of the wave and over any period longer than a modulating cycle will be proportional to its mean value.

Throughout this specification the terms "mean voltage" and "crest voltage" of a modulated wave will be understood as referring to the envelop of the wave; referred to the carrier both are crest voltages.

Figures 1 through 4 in the drawing illustrate various modifications of my invention, wherein the factors just described are utilized to give a direct reading of the degree of modulation of a high frequency wave. In each of these figures the metering circuit is bridged across a portion of a circuit carrying a modulated high frequency current which is to be metered. This is represented in the figures as an inductance 1, but it is to be understood that this inductance may be replaced by a capacitance, or may be a portion of a straight connecting lead, the only requirement being that a sufficient potential drop exist across the points bridged by the metering circuit to operate that circuit properly.

The form of my invention illustrated in Figure 1 comprises leads 2 and 3, which are bridged across the inductance 1 above mentioned, the leads feeding the two detector circuits. The first of these circuits comprises a resistance 5 connected in parallel with a capacitance 6, both of which elements are connected to the lead 2, and which are also connected to the lead 3 through a rectifier 7. This rectifier may be a crystal rectifier, a two-element vacuum tube, or a rectifier of the copper oxide type. One winding 8 of a current ratio meter 9 is connected in series with the rectifier 7 and the resistive arm of the parallel circuit.

The second detector circuit comprises a capacitance 10 in parallel with a resistance 11, which is connected to the line 3 through the rectifier 12, and the other winding 13 of the ratio meter 9 is in series with the rectifier and the resistance arm 11 of the circuit.

Preferably the resistances 5 and 11 are of the same value, and the rectifiers 7 and 12 have similar characteristics, the different time constants being given to the two detector circuits by making the condenser 6 relatively very large and the condenser 10 relatively very small. Under these circumstances the currents flowing in the two circuits, i. e., in the two windings of the ratio meter 9, will have the same value if the high frequency current in the inductance 1 be unmodulated. This simplifies the design of the meter 8 to some extent, but it is quite possible to make its windings carry different numbers of turns of wire, and thus compensate for differences between the resistances 5 and 11 or for rectifier characteristics.

Figure 5:
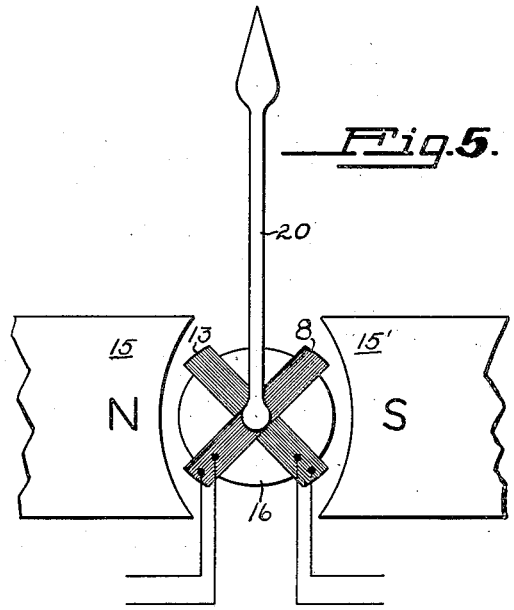
Figure 5 is a schematic diagram of a current ratio meter of a type adapted for use with my invention.

Various types of current ratio meters have long been known, and have been used primarily in connection with ohmmeters. One such meter is shown schematically in Figure 5, wherein the reference characters 15 and 15′ indicate the pole-pieces of a permanent magnet of the same general type as is used in the well known D'Arsonval galvanometer. Positioned between the pole-pieces is a soft iron core 16, the structure differing from that in the usual D'Arsonval meter in that the curvature of the pole-faces is not concentric with the curvature of the core 16, so that the air gap varies from a minimum in the center of the pole-faces to a maximum at their edges.

Wound on rectangular frames which are rotatable within the air gap and which are fixed together in crossed relationship, are two coils 8 and 13. The coils are pivoted to rotate through the varying gaps, but are arranged so that negligible restoring force acts upon them to swing them to any predetermined position in the gaps. The crossed coils carry a pointer 20 which reads upon a suitable scale.

The current from the two detector circuits traverses the coils 8 and 13 in opposite directions, these currents being so directed as to tend to swing each coil from the narrow part of the air gap toward the position of maximum gap. The coil structure will move in the direction of stronger torque, thereby moving the coil having the stronger current into a less intense portion of the magnetic field, while the coil carrying the weaker current moves into a stronger field. The coil will therefore quickly reach a stable position wherein the two torques are balanced, there being one definite position for any given current ratio. The current through the rectifier 7 is sensibly constant, owing to the large time constant of the circuit. The current through the rectifier 12 fluctuates at the modulating frequency. Owing to the mass of the pointer and coils, this structure cannot follow the current fluctuations, and the pointer will therefore indicate the ratio between the current through the rectifier 7, and the mean value of the current from the rectifier 12, the mass of the moving system serving to integrate this current. The meter scale may therefore be calibrated to read directly in current ratios or in percentages of modulation.

That the ratio of these two currents is actually a measure of the degree of modulation of the wave, can readily be shown. The condenser 6 can discharge through the resistor 5 so slowly that it must eventually charge to the crest voltage of the wave, and it is the voltage of this condenser which is effective in causing current to flow through the resistor 5. The current through the resistor is therefore directly proportional to the crest voltage. The condenser 10, being small, can charge and discharge rapidly enough so that it will follow the envelop of the wave, and hence the average current through the resistor 11 will be proportional to the average voltage. Calling the current through the resistor 5, $I_1$, and that through the resistor 11, $I_2$, the percentage of modulation of the wave is given by the equation $$M = \left(\frac{I_1 - I_2}{I_2}\right) \times 100.$$

Equal currents in the two windings of the meter indicate zero modulation, while a current ratio 2:1 indicates 100% modulation. The meter 9 may be calibrated accordingly.

Figure 3:
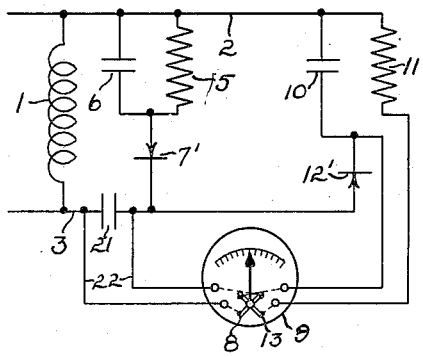

The modification of the invention shown in Figure 3 indicates the method of making the current ratio and the degree of modulation the same. In this arrangement the leads 2 and 3 take off from across the inductance 1 as before, with the two detector circuits of high and low time constants bridged across the line in substantially the same manner. The differences reside in the fact that the detectors 7' and 12' are arranged to rectify in opposite directions instead of in the same direction, as is the case in Figure 1, and that the first winding 8 of the current ratio meter 8 is in series with both of the rectifiers instead of the rectifier associated with the large time constant circuit only.

This is accomplished by inserting a condenser 21 in series with the line 3 between the inductance 1 and the two detector circuits, and shunting the condenser with the line 22 which feeds the first winding of the meter. The direct current through the meter will then be the difference between the two rectified currents. The second winding 13 is in series with the rectifier 12' and the resistor 11 only, and the current ratio measured will therefore be the ratio $(I_1 - I_2)$ to $I_2$, this quantity, multiplied by 100, being the percentage of modulation.

Figure 4:
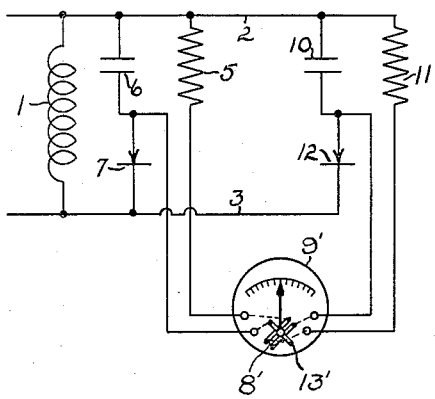

Still another method of accomplishing the same results is shown in Figure 4. This figure differs from Figure 1 only in the meter 9'. In this meter one of the coils, indicated as 8', is wound as two equal and opposite sections. One of these sections is connected in series with the coil 13'. The other section carries the current from the low time constant circuit only. The resultant effect is as though the coil 8' carried a single current equal to the difference between currents $I_1$ and $I_2$, and the meter registers the ratio between this difference current and the current $I_2$ as before.

Figure 2:
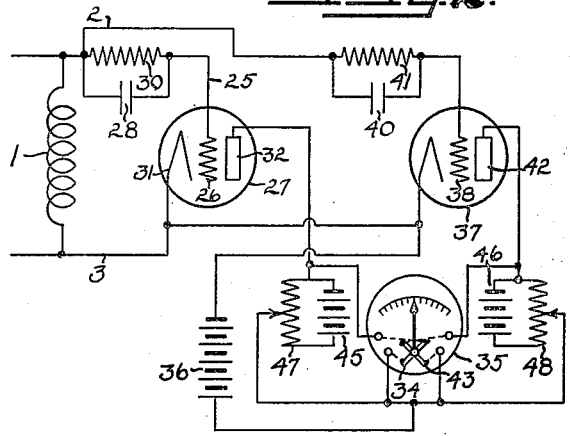
Figure 2 is a circuit diagram of a modification of the invention wherein vacuum tube detectors are used, and which is applicable in circuits wherein only small amounts of modulated power are available.

The detectors shown in the circuits thus far described have been simple rectifiers, and hence are relatively insensitive. Figure 2 illustrates a method of using detectors of the triode type in order to gain the advantage of the amplification of the tube and the resultant increase in sensitivity. In this modification the leads 2 and 3 are bridged across the inductance 1 as before. From the lead 2 is derived a circuit comprising a conductor 25, connecting to the grid 26 of a triode 27 through a grid condenser 28, which is bridged by a grid leak 30. This grid condenser and leak comprise the large time constant circuit of the device, the condenser 28 being relatively very large. The filament 31 of the tube 27 connects with the lead 3. The plate 32 of the tube 27 connects through the winding 34 of the ratio meter 35 to the B-battery or plate supply 36.

A second detector tube 37 also has its filament circuit connected with the lead 3, and its grid 38 connects through a grid condenser 40 shunted by a grid resistor 41 to the lead 2. The plate 42 connects through the second winding 43 of the current ratio meter 35 to the B-battery 36. This grid leak and condenser comprise the low time constant device, the condenser 40 being relatively small.

The constant component of the plate current of each of the tubes 27 and 37 is preferably balanced out of the meter winding in a well known manner by the use of the small batteries 45 and 46, which are bridged by the potentiometers 47 and 48, the latter being shunted around the meter winding. By adjusting the potentiometers, the flow from the batteries can be made exactly equal and opposite to the constant current component from the plates of the two tubes.

When a modulated current flows in the inductance 1, a potential is impressed across the two detector circuits, the filament and grid of each of the two acting as a rectifier to charge the condensers 28 and 40 respectively. Since the circuit comprising the condenser 28 and resistor 30 has a large time constant, the voltage to which the condenser charges will, as before, be proportional to the crest voltages of the modulated wave. The condenser 40 and resistor 41 having a small time constant current, the condenser will charge to a voltage which varies with the envelop voltage of the wave. The plate current in each of the tubes varies with the voltages to which the condensers 38 and 40 are charged, and since the constant component of the plate current is balanced out in the meter, the net current flowing in the meter windings will be proportional to the two voltages. The meter 35 can therefore be calibrated to read directly in percentage modulation as before.

For best results it is important that the two detectors 27 and 37 be adjusted to give straight-line detection, since in this case the per cent of modulation as indicated by the meter will not vary with the amplitude of the modulated wave. The conditions for straight-line detection are well known in the art, and hence will not be gone into in detail here.

I claim:

1. The method of modulation measurement which comprises deriving from a modulated wave direct currents proportional respectively to the crest voltage and mean voltage of said wave, and determining the degree of modulation from comparison of said currents.

2. The method of modulation measurement which comprises deriving from a modulated wave direct currents proportional respectively to the crest voltage and mean voltage of said wave, and determining the degree of modulation from direct measurement of the ratio of said currents.

3. The method of modulation measurement which comprises rectifying a modulated wave to obtain therefrom direct currents proportional respectively to the crest and mean voltages of said wave, and determining the degree of modulation from comparison of said currents.

4. The method of modulation measurement which comprises deriving from a modulated wave direct currents proportional respectively to the crest voltage and mean voltage of said wave, and determining the degree of modulation from the ratio between the average-voltage current and the difference between said average-voltage current and the crest-voltage current.

5. A modulation metering system comprising the combination with a circuit for modulated high frequency current, of a pair of resistance-capacitance circuits having different time constants, one of said constants being longer than the period of the lowest modulating frequency and the other shorter than the period of the highest modulating frequency, rectifying means for supplying each of said circuits from said modulated current circuit, and means for comparing the current flow to each of said circuits.

6. A modulation metering system comprising the combination with a circuit for modulated high frequency current, of a pair of resistance-capacitance circuits having different time constants, one of said constants being longer than the period of the lowest modulating frequency and the other shorter than the period of the highest modulating frequency, rectifying means for supplying each of said circuits from said modulated current circuit, and means for measuring directly the ratio of two currents whose magnitudes are respectively dependent upon the current flow to said circuits.

7. A modulation metering system comprising the combination with a circuit for modulated high frequency current, of a resistance capacitance circuit having a large time constant as compared to the lowest modulating frequency in said first mentioned circuit, a resistance-capacitance circuit having a small time constant as compared with the highest modulating frequency in said first mentioned circuit, rectifying means for supplying each of said latter mentioned circuits with current from said first mentioned circuit, and means simultaneously responsive to current flow in said resistance-capacitance circuits for comparing said current flows.

8. A modulation metering system comprising the combination with a circuit for modulated high frequency current, of a resistance capacitance circuit having a large time constant as compared to the lowest modulating frequency in said first mentioned circuit, a resistance-capacitance circuit having a small time constant as compared with the highest modulating frequency in said first mentioned circuit, rectifying means for supplying each of said latter mentioned circuits with current from said first mentioned circuit, and a differentially wound meter connected to respond to current flow in said resistance-capacitance circuits.

9. In combination with a circuit for modulated high frequency current, a circuit having a large time constant as compared with the lowest modulating frequency in said first mentioned circuit, a circuit having a small time constant as compared with the highest modulating frequency in said first mentioned circuit, rectifying means for supplying current to each of said latter circuits from said modulated current circuit, and a meter having differential windings included in each of said latter mentioned circuits and directly responsive to the ratio of currents therein.

10. A modulation metering system comprising the combination with a circuit for modulated high frequency current, of a pair of resistance-capacitance circuits having different time constants comparable respectively with the periods of highest and lowest modulating frequencies in said first mentioned circuit, vacuum tubes connected to charge the capacitances of each of said circuits by grid rectification from the modulated current circuit, and means for comparing the plate currents of said tubes to determine the degree of modulation of said modulated current.

11. In combination with a circuit for modulated high frequency current, a pair of detector circuits operatively associated with said modulated current circuit, said detector circuits having different time constants comparable respectively with the periods of highest and lowest modulating frequencies in said first mentioned circuit, and means for comparing the detected current output from said detector circuits.

12. In combination with a circuit for modulated high frequency current, a pair of detector circuits operatively associated with said modulated current circuit, one of said detector circuits having a time constant large in comparison with the period of the lowest modulating frequency and the other having a time constant small in comparison with the period of the highest modulating frequency carried by said modulated current circuit, and means for comparing the detected current output from said detector circuits.

13. In combination with a circuit for modulated high frequency current, a pair of detector circuits operatively associated with said modulated current circuit, said detector circuits having different time constants comparable respectively with the periods of highest and lowest modulating frequencies in said first mentioned circuit, and means for directly measuring the ratio between the detected current outputs from said detector circuits.

14. In combination with a circuit for modulated high frequency current, a pair of detector circuits operatively associated with said modulated current circuit, said detector circuits having different time constants comparable respectively with the periods of highest and lowest modulating frequencies in said first mentioned circuit, and a direct current meter having a plurality of windings, one of said windings being connected to the detector circuit of lower time constant and another of said windings being connected to the detector circuit of higher time constant, whereby the meter is responsive to the ratio of the currents in said windings to indicate directly the degree of modulation of said high frequency current.

15. A modulation meter comprising a pair of condensers, means for charging said condensers to potentials respectively proportional to the mean voltage and the crest voltage of a modulated wave, and indicating means responsive to the ratio of the charges on said condensers.

16. A modulation metering system comprising an electrical circuit responsive to the crest voltage of an applied modulated wave, a second circuit responsive to envelop variations in said wave, indicating means connected to said second circuit and responsive to the mean excitation thereof, and connections from said first circuit to said indicating means to vary its response in accordance with the excitation of said first circuit.

17. A modulation metering system comprising an electrical circuit responsive to the crest voltage of an applied modulated wave, a second circuit responsive to envelop variations in said wave, indicating means connected to said second circuit and having a period of mechanical vibration in excess of the period of variation in the envelop of said wave, and connections from said first circuit to said indicating means to vary its response in accordance with the excitation of said first circuit.

18. A modulation metering system comprising an electrical circuit responsive to the crest voltage of an applied modulated wave, a second circuit responsive to envelop variations in said wave, and means for comparing the relative response of said circuits, said means being operative to integrate the variations of response in said second circuit to the mean value thereof.

In testimony whereof, I have hereunto set my hand.

FREDERICK E. TERMAN.